United States Patent
Kim et al.

(10) Patent No.: US 9,663,384 B2
(45) Date of Patent: May 30, 2017

(54) METHOD FOR PRODUCING HIGH-PURITY TRIMANGANESE TETRAOXIDE AND HIGH-PURITY TRIMANGANESE TETRAOXIDE PRODUCED BY THE METHOD

(71) Applicant: INDUSTRY FOUNDATION OF CHONNAM NATIONAL UNIVERSITY, Gwangju (KR)

(72) Inventors: Myong Jun Kim, Gwangju (KR); Tam Tran, Gwangju (KR)

(73) Assignee: INDUSTRY FOUNDATION OF CHONNAM NATIONAL UNIVERSITY, Gwangju (KR)

(*) Notice: Subject to any disclaimer, the term of this patent is extended or adjusted under 35 U.S.C. 154(b) by 110 days.

(21) Appl. No.: 14/398,108

(22) PCT Filed: Apr. 30, 2013

(86) PCT No.: PCT/KR2013/003710
§ 371 (c)(1),
(2) Date: Oct. 30, 2014

(87) PCT Pub. No.: WO2013/165148
PCT Pub. Date: Nov. 7, 2013

(65) Prior Publication Data
US 2015/0125366 A1    May 7, 2015

(30) Foreign Application Priority Data

Apr. 30, 2012  (KR) .................. 10-2012-0045432
Aug. 28, 2012  (KR) .................. 10-2012-0094216

(51) Int. Cl.
*C01G 45/02*    (2006.01)
*C22B 47/00*    (2006.01)
(Continued)

(52) U.S. Cl.
CPC .......... *C01G 45/02* (2013.01); *C01G 49/009* (2013.01); *C22B 7/02* (2013.01); *C22B 47/00* (2013.01);
(Continued)

(58) Field of Classification Search
None
See application file for complete search history.

(56) References Cited

U.S. PATENT DOCUMENTS 2,451,647 A * 10/1948 Allen .................. C22B 47/00
                                                  423/52

FOREIGN PATENT DOCUMENTS

JP    56-026725 A    3/1981
JP    2001-256984 A    9/2001
(Continued)

OTHER PUBLICATIONS

International Search Report for PCT/KR2013/003710.
(Continued)

*Primary Examiner* — Colin W Slifka
(74) *Attorney, Agent, or Firm* — The PL Law Group, PLLC (57) ABSTRACT

A method for producing high-purity trimanganese tetraoxide from dust containing manganese includes adding sulfuric acid ($H_2SO_4$) and a reductant to manganese dust and leaching manganese therefrom; eliminating primary impurities by adding calcium hydroxide ($Ca(OH)_2$)) to the leached manganese solution acquired from the leaching step; eliminating secondary impurities by adding sulfides to the leached manganese solution from which primary impurities have been eliminated; precipitating manganese by using sodium hydroxide (NaOH) so as to control the pH in the leached manganese solution from which secondary impurities have been eliminated, and cleaning and drying the precipitated (Continued)

specimen; and acquiring high-purity trimanganese tetraoxide by injecting the dried specimen with air and heat-treating same under oxidizing conditions. Thus the present invention allows high-purity trimanganese tetraoxide to be produced from dust containing manganese, for use as material for a secondary battery.

15 Claims, 5 Drawing Sheets (51) Int. Cl.
  *C01G 49/00*   (2006.01)
  *C22B 7/02*   (2006.01)
  *H01M 4/50*   (2010.01)
(52) U.S. Cl.
  CPC ...... *C01P 2002/72* (2013.01); *C01P 2002/88* (2013.01); *C01P 2004/32* (2013.01); *C01P 2006/12* (2013.01); *C01P 2006/80* (2013.01); *H01M 4/502* (2013.01); *Y02P 10/212* (2015.11)

(56) References Cited

FOREIGN PATENT DOCUMENTS

KR    10-0975317 B1    8/2010
KR    10-1011260 B1    1/2011

OTHER PUBLICATIONS

Office action from Korean Intellectual Property Office (KIPO) in a counterpart Korean patent application.
Y.Q. Chang et al., Large-scale fabrication of single-crystalline Mn3O4 nanowires via vapor phase growth, Journal of Crystal Growth, vol. 279, pp. 88-92, Apr. 12, 2005.

* cited by examiner

METHOD FOR PRODUCING HIGH-PURITY TRIMANGANESE TETRAOXIDE AND HIGH-PURITY TRIMANGANESE TETRAOXIDE PRODUCED BY THE METHOD

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2013/003710, filed 30 Apr. 2013, which claims priority to Korean Patent Application Nos. 10-2012-0045432, filed 30 Apr. 2012, and 10-2012-0094216, filed 28 Aug. 2012, entire contents of which are incorporated herein by reference.

TECHNICAL FIELD

The present invention relates to a method for producing high-purity trimanganese tetraoxide from low-purity manganese-containing dust.

BACKGROUND ART

With the wide spread of electronic appliances including laptop computers, cellular phones, etc., there has recently been a rapid increase in demand for secondary batteries. A secondary battery is composed of an anode, a cathode, an electrolyte, and a separation membrane. Manganese oxides are widely used as the main materials for the cathode. Demand for secondary batteries is now rapidly increasing, with the consequent increase in materials necessary for the production of secondary batteries.

Manganese oxides are widely used as electrode materials for secondary batteries. A manganese oxide is a compound composed of manganese and oxygen as its name implies, and examples thereof include manganese oxide (II) (MnO), trimanganese tetraoxide ($Mn_3O_4$), manganese oxide (III) ($Mn_2O_3$), manganese oxide (IV) ($MnO_2$), and manganese oxide (VII) ($Mn_2O_7$). As a cathode material for secondary batteries, trimanganese tetraoxide ($Mn_3O_4$) or manganese oxide (III) ($Mn_2O_3$) may be available. Recently, trimanganese tetraoxide ($Mn_3O_4$) has become the predominant choice over manganese oxide (III) ($Mn_2O_3$) due to production cost. However, almost all the amount of trimanganese tetraoxide ($Mn_3O_4$) needed as an electrode material for secondary batteries is imported.

Recovery of manganese compounds is described in many documents. For instance, Korean Patent No. 10-1052192 discloses a method for recovering manganese compounds from electric arc furnace dust. In detail, Korean Patent No. 10-1052192 describes the recovery of manganese compounds from electric arc furnace dust, with the concomitant recovery of ammonium sulfate according to acids and bases used for the production of alkaline metal compounds and manganese compounds. However, the trimanganese tetraoxide recovered by the method has a low purity of about 60%, and thus it is difficult to recover high-purity trimanganese tetraoxide by the method.

Korean Patent Application Unexamined Publication No. 2001-0113176 describes a method for producing high-purity manganese oxide by low-temperature pyrolysis of manganese nitrate. In detail, Korean Patent Application Unexamined Publication No. 2001-0113176 addresses the production of trimanganese tetraoxide by reductively roasting a manganese material, leaching nitric acid, primarily purifying to remove impurities, partially degrading manganese nitrate, washing the manganese dioxide produced in the partial degradation process, sintering the washed manganese dioxide to manganese oxide, and pulverizing. The trimanganese tetraoxide produced by this method is 71.3% pure, so that the method is difficult to apply to the preparation of high-purity trimanganese tetraoxide.

SUMMARY

It is therefore an object of the present invention to provide a novel method for producing high-purity trimanganese tetraoxide from low-purity manganese-containing dust.

In accordance with an aspect thereof, the present invention provides a method for producing high-purity trimanganese tetraoxide ($Mn_3O_4$), comprising: leaching manganese from manganese-containing dust with sulfuric acid ($H_2SO_4$) and a reductant to give a manganese leachate; removing a first impurity from the manganese leachate with calcium hydroxide ($Ca(OH)_2$); removing a second impurity from the first impurity-depleted manganese leachate with a sulfide; precipitating manganese by adjusting pH of the manganese leachate free of both first and second impurities with sodium hydroxide (NaOH) then washing and drying the precipitate; and thermally treating the dried precipitate with air in an oxidative condition.

In the manganese leaching step, sulfur may be added in an amount 0.5 to 3 times the mole content of manganese in the manganese-containing dust.

In the manganese leaching step, the reductant may include an oxalate ($C_2O_4^{2-}$)-containing reagent or sulfurous acid gas, and may be added in an amount 0.1 to 2 times the mole content of manganese in the manganese-containing dust.

In the method, the oxalate-containing reagent may include oxalic acid ($H_2C_2O_4.2H_2O$) or sodium oxalate ($Na_2C_2O_4$).

In the method, the first impurity-removing step is to remove iron from the manganese leachate, and may further comprise adding potassium and an oxidant.

In the method, calcium hydroxide ($Ca(OH)_2$) is added in such an amount as to adjust pH acidity of the manganese leachate to a pH of 2 to 3.

The first impurity-removing step may further comprise heating the manganese leachate to a temperature of 80 to 120° C. after calcium hydroxide is added.

The first impurity-removing step may further comprise adding an additional amount of calcium hydroxide such that the manganese leachate has a pH of 5 or higher.

Potassium may be added in an amount of 0.5 to 3 times a mole content of iron in the manganese-containing dust, and the oxidant may be added in an amount of 0.5 to 3 times a mole content of iron the manganese-containing dust.

Potassium includes potassium sulfate ($K_2SO_4$), and the oxidant may include hydrogen peroxide ($H_2O_2$).

In the second impurity-removing step, the sulfide may include at least one selected from among sodium sulfide ($Na_2S$), calcium sulfide (CaS) and hydrogen sulfide ($H_2S$) and may be added in an amount 10 to 50 times a total mole of the second impurity.

The second impurity-removing step may further comprise adding sodium hydroxide in such an amount as to adjust acidity of the manganese leachate to a pH of 5 to 6, and performing solid-liquid separation to discard a sulfide slurry containing remainder impurities, with concomitant recovery of a manganese leachate free of the remainder impurities.

The manganese-precipitating step may further comprise diluting the manganese leachate free of both the first and the second impurity with water so that the manganese leachate has a manganese content of 50 to 100 g/L, and sodium hydroxide (NaOH) is used in such an amount as to adjust acidity of the manganese leachate to a pH of 8 to 9.

The washing step utilizes water of 70 to 100° C. after manganese is precipitated.

The thermally treating step may be carried out by heating the precipitate at 800 to 1100° C., and may further comprise quenching the precipitate after the thermal treatment.

In accordance with another aspect thereof, the present invention provides high-purity trimanganese tetraoxide, produced using the method.

As described hitherto, the method of the present invention can produce trimanganese tetraoxide with a purity of 99.9% from a low-purity manganese-containing substance. Also, the high-purity trimanganese tetraoxide is provided.

DETAILED DESCRIPTION

Reference should now be made to the drawings, in which the same reference numerals are used throughout the different drawings to designate the same or similar components.

Figure 1:
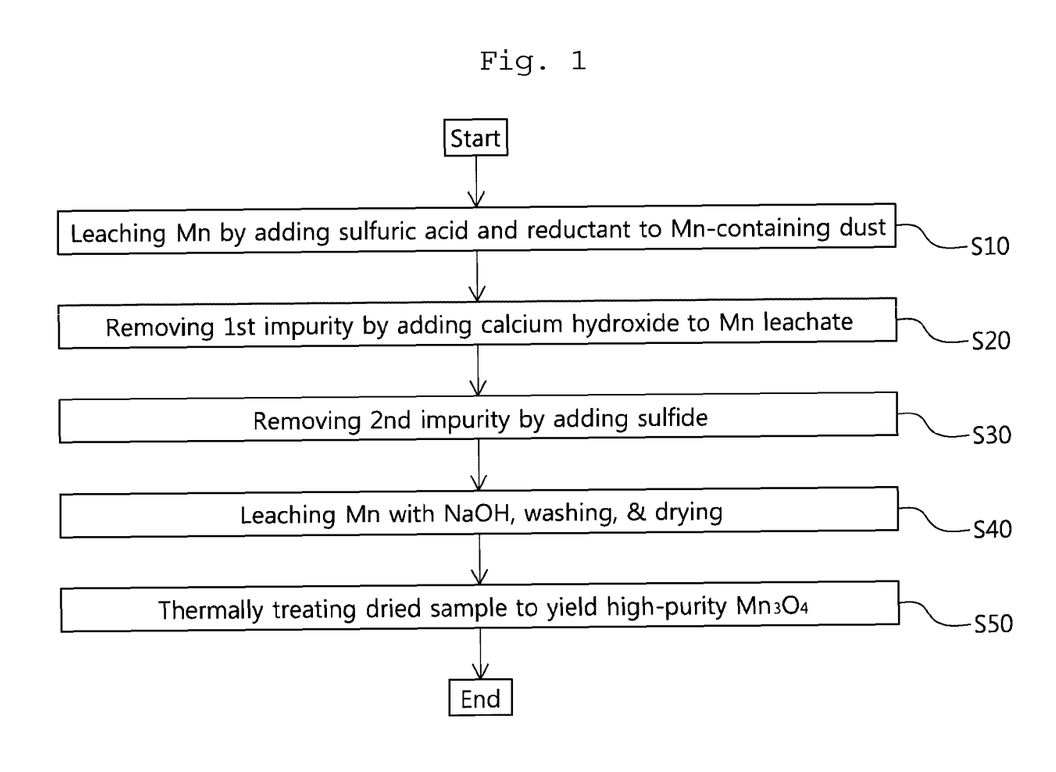
FIG. 1 is a flow chart illustrating the production of high-purity trimanganese tetraoxide according to one embodiment of the present invention.

A production method of high-purity trimanganese tetraoxide according to one embodiment of the present invention is explained in detail with reference to FIGS. 1 and 2. FIG. 1 is a schematic flow chart illustrating the production of high-purity trimanganese tetraoxidee according to one embodiment of the present invention, and FIG. 2 is a detail of the flow chart of FIG. 1.

Figure 2:
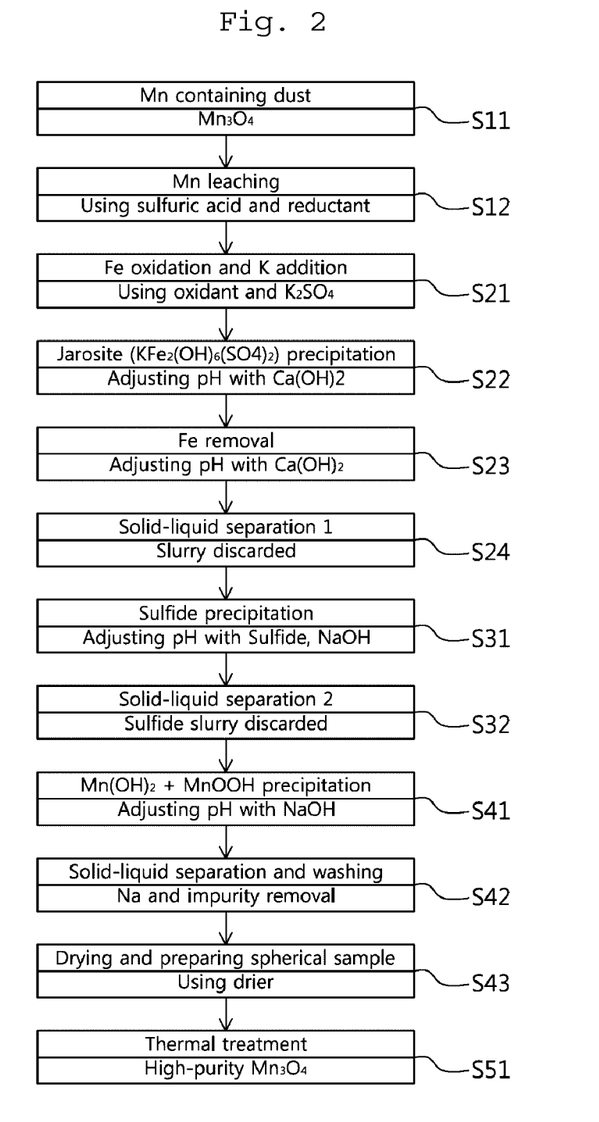
FIG. 2 is a flow chart illustrating the production of high-purity trimanganese tetraoxide according to another embodiment of the present invention.

As shown in FIGS. 1 and 2, the method for producing high-purity trimanganese tetraoxide in accordance with an embodiment of the present invention starts with adding sulfuric acid and a reductant to a low-purity manganese-containing substance to leach manganese (S10).

To begin with, manganese-containing dust is prepared (S11). Low-purity manganese compounds in the manganese-containing dust may include manganese oxides and manganese carbonate such as $MnO$, $MnCO_3$, $Mn_2O_3$, $Mn_3O_4$, $MnO_2$, etc. The manganese compounds in manganese-containing dust show a manganese content of about 60 to 75%, but the manganese compounds themselves are of no significance as a commercial product because impurities coexist. The manganese-containing dust contains impurities such as iron (Fe), nickel (Ni), lead (Pb), zinc (Zn), cobalt (Co), copper (Cu), potassium (K), magnesium (Mg), calcium (Ca), sodium (Na), aluminum (Al), sulfur (S), phosphorus (P), silicon (Si), etc.

To the prepared manganese-containing dust, sulfuric acid and a reductant are added (S12).

In this regard, sulfuric acid ($H_2SO_4$) may be used in an amount 0.5 to 3 times the mole content of manganese in the manganese-containing dust, preferably in an amount 1 to 2 times the mole content of manganese in the manganese-containing dust, and more preferably in an amount 1 to 1.5 times the mole content of manganese in the manganese-containing dust.

The reductant that is added together with sulfuric acid may be used in an amount 0.1 to 2 times the mole content of manganese, preferably in an amount 0.5 to 1.5 times the mole content of manganese, and more preferably in an amount 0.5 to 1 times the mole content of manganese.

The reductant may include an oxalate ($C_2O_4^{2-}$)-containing reagent, or sulfurous acid gas. Examples of the oxalate ($C_2O_4^{2-}$)-containing reagent include oxalic acid ($H_2C_2O_4 \cdot 2H_2O$) and sodium oxalate ($Na_2C_2O_4$). For use as a reductant in the present invention, the oxalate-containing reagent may be dissolved in a predetermined amount in water before addition whereas sulfurous acid gas may be directly added.

When sulfuric acid and a reductant are added in the amounts defined above to manganese-containing dust, reactions occur as illustrated by the following Reaction Formulas. By the action of sulfuric acid and the reductant, manganese in the manganese-containing dust is leached in the form of manganese sulfate.

$MnO+H_2SO_4=MnSO_4+H_2O$ [Reaction Formula 1]

$Mn_2O_3+H_2SO_4=MnSO_4+MnO_2+H_2O$ [Reaction Formula 2]

$MnO_2+H_2SO_4H_2C_2O_4=MnSO_4+2H_2O+2CO_2$ [Reaction Formula 3]

$Mn_3O_4+3H_2SO_4+H_2C_2O_4=3MnSO_4+4H_2O+2CO_2$ [Reaction Formula 4]

Also, the production method according to this embodiment of the present invention comprises adding calcium hydroxide ($Ca(OH)_2$) to the manganese leachate obtained in step S12 to remove a first impurity from the manganese leachate (S20).

In step S12, manganese is leached in the form of manganese sulfate from the manganese-containing dust by sulfuric acid and the reductant to give a manganese leachate. This manganese leachate contains impurities that must be removed. In this step, the impurity is iron.

The first impurity-removing step may further comprise adding potassium (K) and an oxidant to the manganese leachate obtained in step S12 (S21). Thus, step S21 is configured to precipitate iron by using an oxidant to precipitate the iron of the manganese leachate of step S12 in the form of K-jarosite ($KFe_3(SO_4)_2(OH)_6$) through oxidation, and potassium (K), necessary for the formation of K-jarosite, to promote the subsequent calcium hydroxide-induced iron precipitation.

Potassium (K) may be added in an amount 0.5 to 3 times, preferably in an amount 0.5 to 2.5 times, and more preferably I an amount of 1 to 2 times the mole content of iron in the manganese leachate. Examples of potassium may include potassium sulfate ($K_2SO_4$).

The oxidant may be added in an amount 0.5 to 3 times, preferably in an amount 0.5 to 2 times, and more preferably in an amount 1 to 1.5 times the mole content of iron in the first manganese leachate. Examples of the oxidant may include hydrogen peroxide ($H_2O_2$).

Following the addition of potassium and the oxidant, calcium hydroxide ($Ca(OH)_2$) is added (S22). In this regard, calcium hydroxide ($Ca(OH)_2$) may be a solution with a concentration of 10~20% or may be used in such an amount as to adjust the acidity of the iron-containing manganese leachate into a pH of 2 to 3. After the addition of calcium hydroxide, the reaction mixture is heated to a temperature of 80 to 120° C., preferably a temperature of 85 to 110° C., and more preferably a temperature of 90 to 100° C., and subjected to a reaction for 2 to 4 hrs, preferably for 2.5 to 3.5 hrs, and more preferably for about 3 hrs. The reaction is conducted as follows.

$$3Fe_2(SO_4)_3 + K_2SO_4 + 3Ca(OH)_2 = 2KFe_3(SO_4)_2(OH)_6 + 3CaSO_4 + 3SO_4^{2-}$$ [Reaction Formula 5]

Hence, after the addition of potassium and an oxidant to the manganese leachate, calcium hydroxide can precipitate iron in a K-jarosite form from the manganese leachate.

In step S22, the temperature of the reaction mixture must be raised only after the pH of the reaction mixture is adjusted with calcium hydroxide. If an increase in temperature is followed by the addition of calcium hydroxide, reactivity sharply increases to cause iron to precipitate in the form of a hydroxide such as $Fe(OH)_3$ or FeOOH, rather than K-jarosite, to which solid-liquid separation is difficult.

In accordance with one embodiment of the present invention, the step S20 may further comprise adding calcium hydroxide $(Ca(OH)_2)$ to adjust acidity of the first manganese leachate to a pH of 5 or higher (S23). In order to remove the remaining iron that was not precipitated as K-jarosite from the manganese leachate, a concentrated (10~20%) $Ca(OH)_2$ solution may be added such that the acidity of the first manganese leachate is adjusted to a pH of 5 or higher, preferably a pH of 5 to 6, and more preferably a pH of 5 to 5.5. At this adjusted pH, remainder iron may be removed as $Fe(OH)_3$ or FeOOH. In step S23, the remaining iron of the manganese leachate may be removed as the reaction proceeds according to Reaction Formula 6.

$$Fe_2(SO_4)_3 + 3Ca(OH)_2 = 2Fe(OH)3 + 3CaSO_4$$ [Reaction Formula 6]

The step S20 may further comprise performing first solid-liquid separation after the removal of iron through the reaction of Reaction Formula 6 (S24). A slurry to which iron is precipitated is discarded by solid-liquid separation to recover an iron-free (or first impurity-depleted) manganese leachate.

However, the iron-free, manganese leachate further contains impurities such as nickel (Ni), lead (Pb), zinc (Zn), cobalt (Co), copper (Cu), etc.

Hence, the production method according to an embodiment of the present invention comprises adding a sulfide to the first impurity-depleted manganese leachate to remove a second impurity from the leachate (S30). Since the first impurity-depleted manganese leachate, although free of iron, contains a second impurity such as nickel (Ni), lead (Pb), zinc (Zn), cobalt (Co), copper (Cu), etc., the second impurity can be removed as a sulfide precipitate when a sulfide is added thereto.

Therefore, a sulfide is added to the first impurity-depleted manganese leachate (S31). The sulfide may include at least one selected from among sodium sulfide $(Na_2S)$, calcium sulfide (CaS) and hydrogen sulfide $(H_2S)$, and may be used in an amount 10 to 50 times, preferably in an amount 15 to 45 times, and more preferably in an amount 30 to 35 times the total mole of the remainder impurity. The pH of the sulfide added may be adjusted to 7 to 8, and preferably 8. The iron-free (or first impurity-depleted) manganese may be reacted with the sulfide for about 10 to 100 min, preferably for about 20 to 80 min, and more preferably for 30 to 60 min. After reaction with a sulfide, sodium hydroxide (NaOH) is added in such an amount as to adjust the acidity of the leachate to a pH of 5 to 6. By reaction with sodium hydroxide for about 10 to 60 min, preferably for 10 to 40 min, and more preferably for 20 to 30 min, the impurity nickel (Ni), lead (Pb), zinc (Zn), cobalt (Co) or copper (Cu) other than iron can be precipitate as a sulfide (NiS, PbS, ZnS, CoS, CuS).

The second impurity-removing step may further comprise performing second solid-liquid separation after sulfide precipitation (S32). Through the second solid-liquid separation, a slurry of sulfide precipitates is discarded while a manganese leachate free of the second impurity can be recovered.

As described above, the manganese leachate free of both the first impurity iron and the second impurities nickel, lead, zinc, cobalt, and copper that can be precipitated as a sulfide contains other impurities and manganese therein. It is thus necessary to selectively dissolve manganese only.

Accordingly, the production method of the present invention comprises adjusting pH of the second impurity-depleted manganese leachate with sodium hydroxide (NaOH) to precipitate manganese, and then washing and drying the precipitate (S40).

In order to precipitate manganese, the manganese precipitation step may further comprise diluting the manganese leachate with water to a manganese content of 50 to 100 g/L in the manganese leachate, and sodium hydroxide (NaOH) is used such that the manganese leachate has a pH of 8 to 9 to precipitate manganese (S41).

At step S41, the dilution may achieved by adding water to the degree that the manganese leachate has a manganese content of 50 to 100 g/L, preferably 55 to 85 g/L, and more preferably 60 to 80 g/L. For selective precipitation of manganese, sodium hydroxide may be used at a temperature of 30 to 80° C., preferably 50 to 70° C., and more preferably 55 to 65° C. in such an amount that the diluted manganese leachate has a pH of 7 to 9 and preferably a pH of 8 to 9. In this step, manganese is recovered as a precipitate of $Mn(OH)_2$ —MnOOH.

The washing step comprises performing third solid-liquid separation to recover manganese as a precipitate and washing the recovered manganese ($Mn(OH)_2$—MnOOH) (S42).

Recovered manganese precipitates as manganese oxides ($Mn(OH)_2$—MnOOH) may be washed at least once with water of 70 to 100° C., and preferably with water of 80 to 90° C. This washing step may be preferably conducted three times using water through which remaining impurities magnesium, calcium, potassium and sodium other than manganese can be removed.

In the drying step, the manganese oxide ($Mn(OH)_2$—MnOOH) precipitate is dried (S43). To this end, a drier, particularly, a spray drier may be employed. In this regard, a conc. solution (20~30%) of the precipitate in distilled water may be prepared, and spray dried. In another embodiment of the present invention, the dried sample may be made as spheroids.

Also, the method of the present invention comprises thermally treating the sample dried in step S43 with air in a high-temperature oxidative condition to yield high-purity trimanganese tetraoxide (S50). For a smooth reaction progression, the sample dried in step S43 is thermally treated at intervals of 10 to 40 min and preferably at intervals of 20 to 30 min at a temperature of 800 to 1100° C. and preferably at a temperature of 900 to 1000° C. for 30 to 180 min and preferably for 60 to 120 min (S51). Alternatively, sulfur, water, and remaining trace impurities may be removed using a rotary kiln furnace under the above-mentioned condition.

The method may further comprise a quenching step after the thermal treatment. The manganese from which impurities are removed by thermal treatment is reduced to $Mn_2O_3$. A quenching step is carried out to oxidize $Mn_2O_3$ to $Mn_3O_4$. The sample is rapidly quenched to room temperature after the thermal treatment. By these steps, high-purity trimanganese tetraoxide ($Mn_3O_4$) that is used as a material for secondary batteries can be obtained.

In accordance with a further aspect thereof, the present invention provides high-purity trimanganese tetraoxide produced by the method described above.

A better understanding of the present invention may be obtained through the following examples which are set forth to illustrate, but are not to be construed as limiting the present invention.

Example 1: Production of High-Purity Trimanganese Tetraoxide

Manganese-containing dust weighing 3 kg was prepared. The composition of manganese-containing dust was as shown in Table 1, below.

TABLE 1

| Compound | Conc.(%) |
|---|---|
| Mn | 72.8 |
| K | 0.27 |
| Fe | 2.82 |
| Mg | 0.15 |
| Ca | 0.22 |
| Na | 0.07 |
| Zn | 0.11 |
| Pb | 0.05 |
| Si | 0.19 |
| P | 0.03 |
| Al | 0.11 |
| S | 0.04 |
| Co | 0.00 |
| Total | 76.8 |

A solution of 2.37 L of sulfuric acid ($H_2SO_4$) in 2.37 L of water and a solution of 1.15 kg of oxalic acid ($H_2C_2O_4.2H_2O$) in 3.5 L of water were added to the manganese-containing dust. Manganese in the manganese-containing dust was leached as manganese sulfate by the addition of sulfuric acid and the reductant.

Of the leachate, iron was precipitated as K-jarosite. For this, 150 mL of hydrogen peroxide ($H_2O_2$) as an oxidant and 77 g of potassium sulfate ($K_2SO_4$) were dissolved in 0.65 L of water and added to the leachate. The pH of the leachate was adjusted to 2 to 3 with 4 L of a conc. (20%) solution of $Ca(OH)_2$. A reaction was carried out at 95° C. for 3 hrs. As a result, iron was precipitated in the form of K-jarosite.

To further remove the iron that might remain even after the reaction, the pH of the leachate was adjusted to 5.5 with 0.5 L of a conc. solution (20%) of $Ca(OH)_2$.

After iron precipitated, the slurry was discarded by first solid-liquid separation while the resulting iron-free manganese leachate was recovered.

To remove the impurities nickel, lead, zinc, cobalt and copper other than iron, a sulfide ($Na_2S$, $H_2S$) was added in an amount 30 to 35 time the mole content of the impurities. Also, the pH of the leachate was adjusted to 5 to 6 with sodium hydroxide, followed by reaction for 20 to 30 min. Then, the resulting sulfide slurry of the impurities was discarded by solid-liquid separation to obtain a manganese leachate free of the impurities.

In order for the manganese leachate to have a total manganese content of 60 to 80 g/L, 5 L of the manganese leachate was diluted with 3 L of water. 8 to 9 L of a 10% sodium hydroxide solution was added to the dilution at 60° C. to adjust the acidity of the manganese leachate to a pH of 8 to 9, thereby precipitate manganese as a form of $Mn(OH)_2$—MnOOH.

The precipitate of manganese oxide in the form of $Mn(OH)_2$—MnOOH was recovered by third solid-liquid separation, and then washed three times with water of 85° C. to remove other impurities such as sodium, etc.

A conc. (20-30%) solution of the washed manganese oxide in distilled water was spray dried with the aid of a spray dryer, and the dried sample was made into spheres.

The spherical samples were thermally treated or roasted at 1000° C. to remove remaining impurities such as sulfur, water, etc., and then quenched into room temperature to afford high-purity trimanganese tetraoxide. The trimanganese tetraoxide was obtained as a crystal with a purity of 99.9%.

Experimental Example 1: Effect of Thermal Treatment and Post-Thermal Treatment (Quenching) on Preparation of Trimanganese Tetraoxide (1) DTA (Differential Thermal Analysis was performed on the trimanganese tetraoxide prepared in Example 1 to examine the effect of the thermal treatment on trimanganese tetraoxide.

Figure 3:
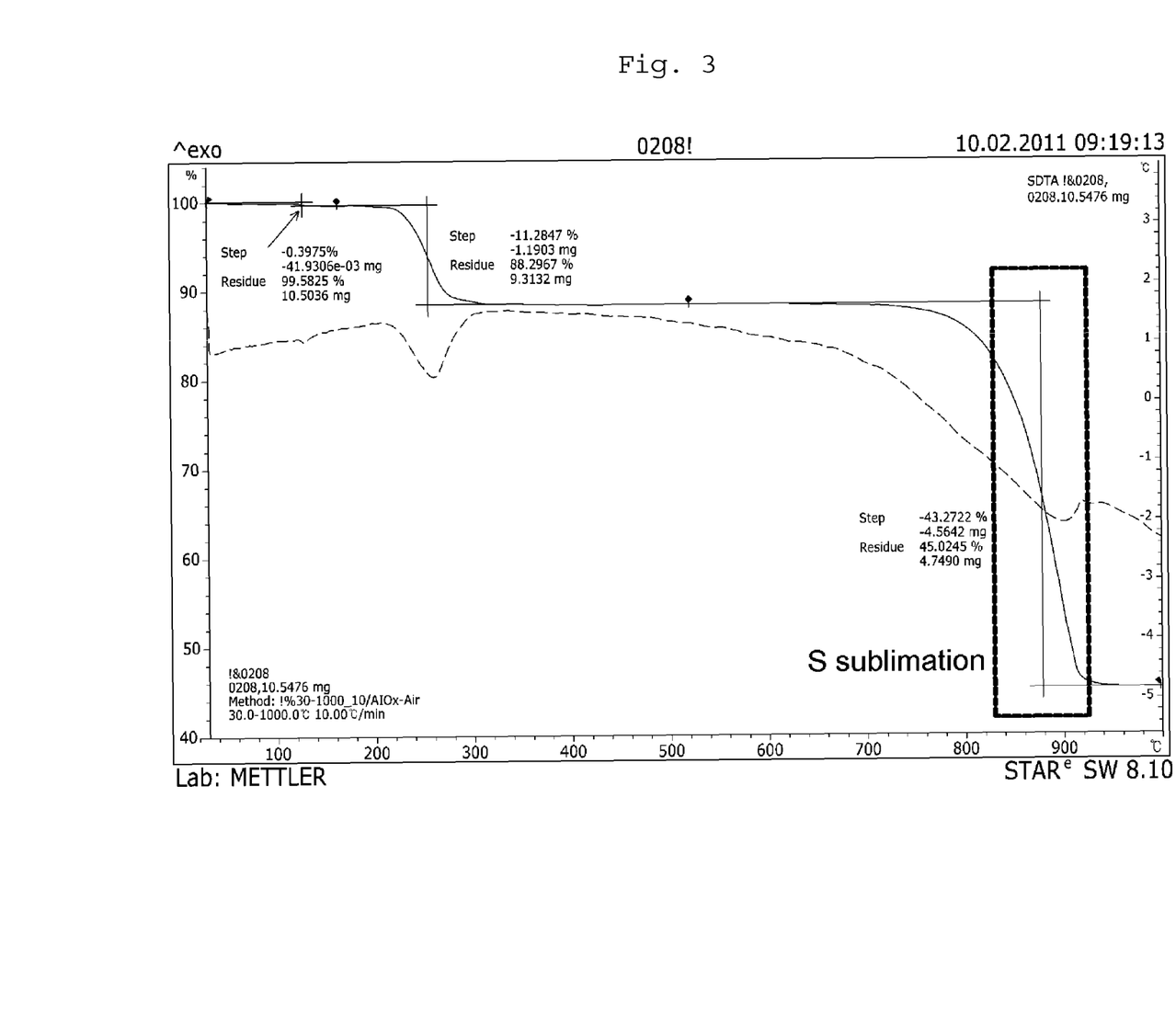
FIG. 3 is a plot illustrating the effect of thermal treatment on the production of high-purity trimanganese tetraoxide according to another embodiment of the present invention.

The result is given in FIG. 3. As indicated by the real line in FIG. 3, sulfur started to sublimate at 800° C. or higher and was removed finally. Hence, the thermal treatment was found to remove trace impurities that might remain even after the depletion of first and second impurities.

(2) As described in Example 1, quenching was conducted after the thermal treatment of 1000° C. For use as a control in examining the effect of quenching on the preparation of trimanganese tetraoxide, a trimanganese tetraoxide sample was prepared in the same manner as in Example 1, with the exception that the sample was not quenched, but slowly cooled after the thermal treatment of 1000° C.

Figure 4:
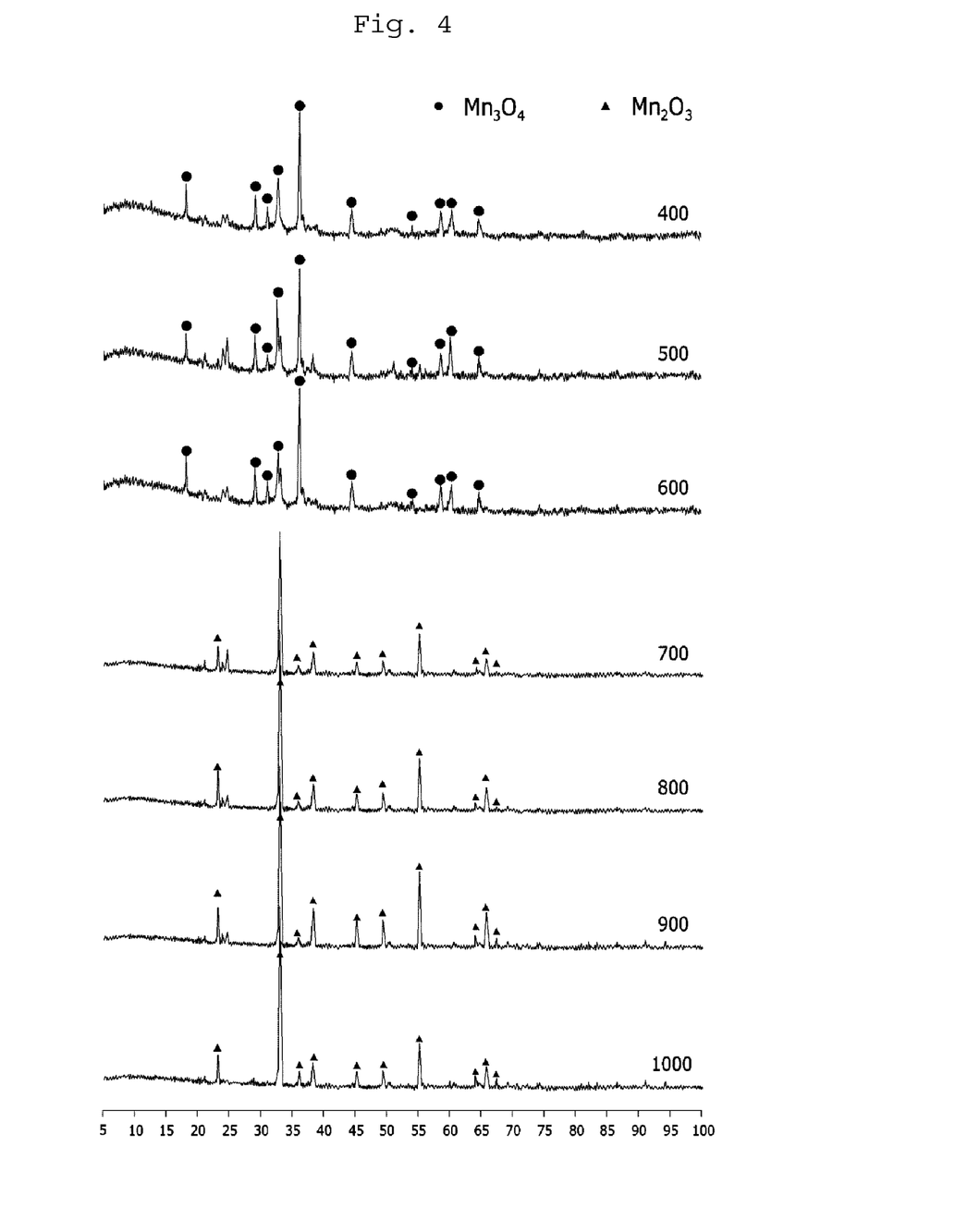
FIG. 4 is a view illustrating the effect of a quenching step after thermal treatment on the production of high-purity trimanganese tetraoxide according to another embodiment of the present invention.

As can be seen in FIG. 4, $Mn_2O_3$ was produced at 700° C. or higher when the sample was slowly cooled after the thermal treatment of 1000° C., but the desired compound $Mn_3O_4$ was not produced. The thermal treatment reduced manganese compounds to $Mn_2O_3$ while functioning to remove trace impurities that might remain even after the depletion of first and second impurities. When the sample was slowly cooled after the thermal treatment, the manganese compounds still remained as the reduced form $Mn_2O_3$. Therefore, the desired compound could not be obtained by slow cooling after the thermal treatment of 1000° C., and the oxidation of $Mn_2O_3$ to $Mn_3O_4$ required rapid cooling within a short period.

Experimental Example 2: Analysis of Trimanganese Tetraoxide of Example 1

Experimental Example 2-1: Ingredient Analysis of Trimanganese Tetraoxide

The trimanganese tetraoxide prepared in Example 1 was analyzed for purity and ingredient. The results are summarized in Table 2, below.

TABLE 2

| Product No. | Spec | Example 1 |
|---|---|---|
| H$_2$O(%) | ≤0.5 | 0.02 |
| SO$_4^{2-}$(%) | ≤0.3 | 0.03 |
| Na(%) | ≤0.02 | N.D |
| Fe(ppm) | ≤30 | N.D |
| Cu(ppm) | ≤1 | 0.07 |
| Ni(ppm) | N.D | N.D |
| Cr(ppm) | N.D | N.D |
| Zn(ppm) | N.D | N.D |
| Mg(ppm) | ≤10 | 7.43 |
| Pb(ppm) | N.D | N.D |
| K(%) | ≤0.02 | N.D |
| Ca(%) | ≤0.02 | N.D |
| BET(m2/g) | ≥1 | 1.089 |
| As(ppm) | — | 0.04 |
| Co(ppm) | — | 0.013 |
| Cd(ppm) | — | N.D |

In Table 1, the Spec column defines a standard specification required for the use of trimanganese tetraoxide as a material of secondary batteries. As, Co, and Cd, although defined in the standard specification of Table 1, were analyzed in this experiment.

As can be seen in Table 1, the trimanganese tetraoxide prepared in Example 1 was found to exactly meet the standard specification. Accordingly, the trimanganese tetraoxide produced by the method of the present invention was proven to be effective as a material for secondary batteries.

Experimental Example 2-2: XRD Analysis of High-Purity Trimanganese Tetraoxide

To examine whether the high-purity trimanganese tetraoxide produced in Example 1 is suitable for use in secondary batteries, X-ray diffraction (XRD) analysis was performed while the standard Mn$_3$O$_4$ used in secondary batteries served as a control.

Figure 5:
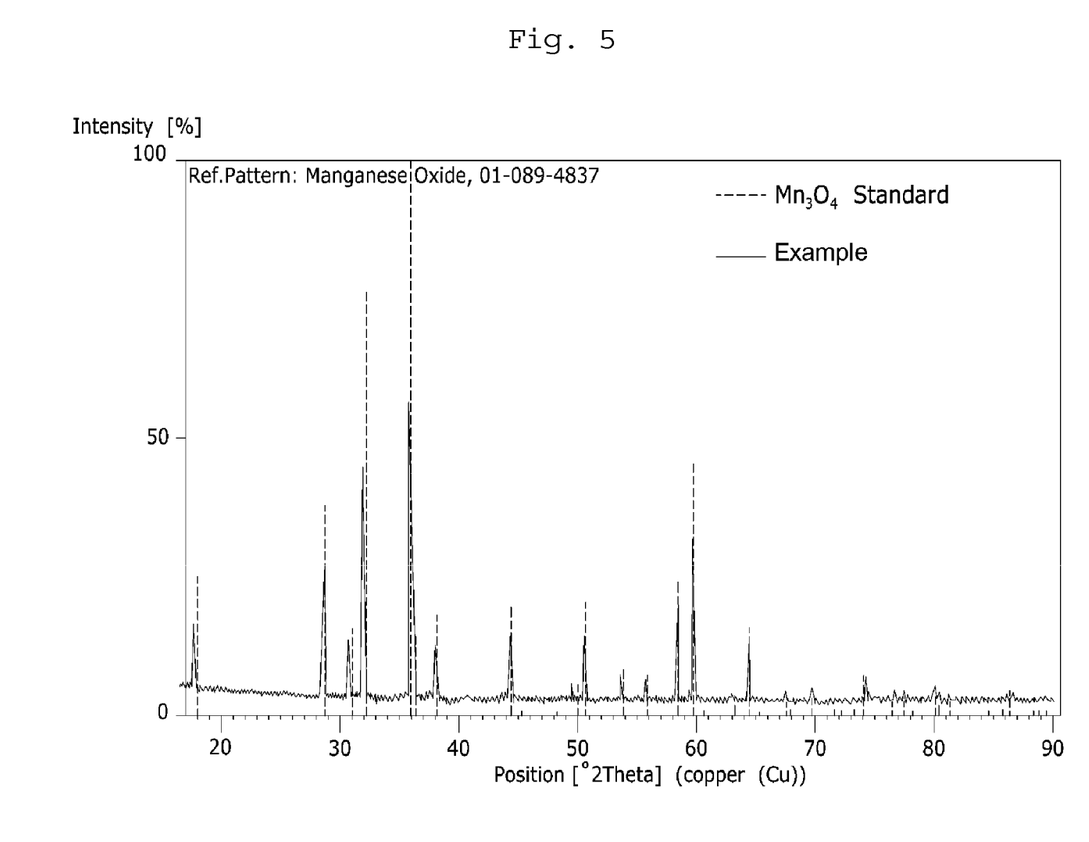
FIG. 5 shows an XRD pattern of the high-purity trimanganese tetraoxide produced according to one embodiment of the present invention.

The results are depicted in FIG. 5. As can be seen in FIG. 5, X-ray peak patterns of the trimanganese tetraoxide prepared in Example 1 in accordance with the present invention were found to nearly perfectly match with those of the standard Mn$_3$O$_4$. Accordingly, the trimanganese tetraoxide prepared according to the method of the present invention was proven effectively usable as a material for secondary batteries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described hitherto, the method of the present invention can produce high-purity trimanganese tetraoxide from manganese-containing dust, and the trimanganese tetraoxide produced can be useful as a material of secondary batteries, thus demonstrating its industrial applicability.

The invention claimed is:

1. A method for producing high-purity trimanganese tetraoxide (Mn$_3$O$_4$), comprising:
   leaching manganese from manganese-containing dust with sulfuric acid (H$_2$SO$_4$) and a reductant to give a manganese leachate;
   removing a first impurity from the manganese leachate with calcium hydroxide (Ca(OH)$_2$);
   removing a second impurity from the first impurity-depleted manganese leachate with a sulfide;
   precipitating manganese by adjusting pH of the manganese leachate free of both first and second impurities with sodium hydroxide (NaOH) then washing and drying the precipitate; and
   thermally treating the dried precipitate with air in an oxidative condition to produce Mn$_2$O$_3$; and
   quenching the thermally treated precipitate to oxidize said Mn$_2$O$_3$ to Mn$_3$O$_4$.

2. The method of claim 1, wherein sulfur is added in an amount 0.5 to 3 times a mole content of manganese in the manganese-containing dust in the manganese leaching step.

3. The method of claim 2, wherein the reductant of the manganese leaching step includes an oxalate (C$_2$O$_4^{2-}$)-containing reagent or sulfurous acid gas, and is added in an amount 0.1 to 2 times a mole content of manganese in the manganese-containing dust.

4. The method of claim 3, wherein the oxalate-containing reagent includes oxalic acid (H$_2$C$_2$O$_4$.2H$_2$O) or sodium oxalate (Na$_2$C$_2$O$_4$).

5. The method of claim 1, wherein the first impurity-removing step is to remove iron from the manganese leachate, and further comprises adding potassium and an oxidant.

6. The method of claim 5, wherein calcium hydroxide (Ca(OH)$_2$) is added in such an amount as to adjust pH acidity of the manganese leachate to a pH of 2 to 3.

7. The method of claim 6, wherein the first impurity-removing step further comprises heating the manganese leachate to a temperature of 80 to 120° C. after calcium hydroxide is added.

8. The method of claim 7, wherein the first impurity-removing step further comprises adding an additional amount of calcium hydroxide after heating the manganese leachate such that the manganese leachate has a pH of 5 or higher.

9. The method of claim 5, wherein potassium is added in an amount of 0.5 to 3 times a mole content of iron in the manganese-containing dust, and the oxidant is added in an amount of 0.5 to 3 times a mole content of iron the manganese-containing dust.

10. The method of claim 9, wherein potassium includes potassium sulfate (K$_2$SO$_4$), and the oxidant includes hydrogen peroxide (H$_2$O$_2$).

11. The method of claim 1, wherein the sulfide of the second impurity-removing step includes at least one selected from among sodium sulfide (Na$_2$S), calcium sulfide (CaS) and hydrogen sulfide (H$_2$S) and is added in an amount 10 to 50 times a total mole of the second impurity.

12. The method of claim 11, wherein the second impurity-removing step further comprises adding sodium hydroxide in such an amount as to adjust acidity of the manganese leachate to a pH of 5 to 6, and performing solid-liquid separation to discard a sulfide slurry containing remainder impurities, with concomitant recovery of a manganese leachate free of the remainder impurities.

13. The method of claim 1, wherein the manganese-precipitating step further comprises diluting the manganese leachate free of both the first and the second impurity with water so that the manganese leachate has a manganese content of 50 to 100 g/L, and sodium hydroxide (NaOH) is used in such an amount as to adjust acidity of the manganese leachate to a pH of 8 to 9.

14. The method of claim 1, wherein the washing step utilizes water of 70 to 100° C. after manganese is precipitated.

15. The method of claim 1, wherein the thermally treating step is carried out by heating the precipitate at 800 to 1100° C.

* * * * *